3,335,141
4-SUBSTITUTED-1-ALKYL-6-(5-NITRO-2-FURYL)-1H-PYRAZOLO[3,4-d]PYRIMIDINES

Homer Albert Burch, Norwich, N.Y., assignor to The Norwich Pharmacal Company, Norwich, N.Y., a corporation of New York
No Drawing. Filed Aug. 17, 1964, Ser. No. 390,207
14 Claims. (Cl. 260—256.4)

This application is a continuation-in-part of my copending application Ser. No. 318,502, filed Oct. 24, 1963, and now abandoned.

This invention relates to nitrofuran compounds, methods for the preparation thereof and furan compounds useful in the preparation of the nitrofurans. More particularly, it is concerned with a series of 4-substituted-1-alkyl - 6-(5-nitro-2-furyl)-1H-pyrazolo[3,4-d] pyrimidines of the formula:

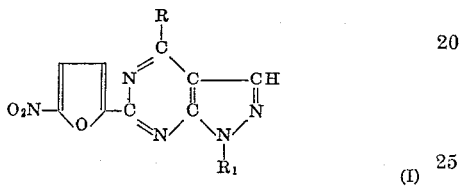

(I)

wherein R represents a member of the group consisting of hydroxy, chloro and

wherein X and Y represent a member of the group consisting of hydrogen and hydroxyethyl; and $R_1$ represents a member of the group consisting of lower alkyl and methoxyethyl. It is to be understood that, when R is hydroxy, the keto form is also contemplated in accordance with the usual tautomerism associated with such configuration, e.g.,

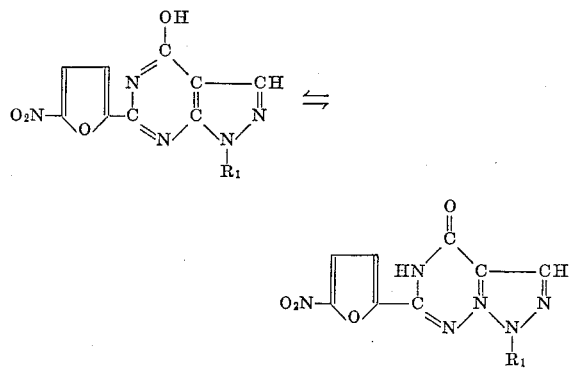

This invention is also concerned with furan compounds of the formula:

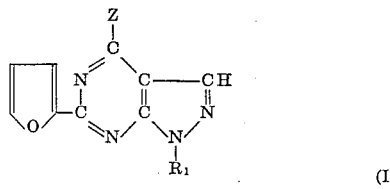

(II)

wherein Z represents a member of the group consisting of hydroxy and amino and $R_1$ has the aforestated significance useful in the preparation of the compounds of Formula I.

The compounds of Formula I are distinguished by their ability to inhibit the growth of bacteria. This effect extends to both gram-positive and gram-negative organisms. Representative of this effect is the compound 4-amino-1-methyl-6-(5-nitro-2-furyl)-1H-pyrazolo[3,4-d] pyrimidine whose bacterial inhibitory propensity when tested by the commonly employed serial dilution technique is depicted below.

| Organism: | Minimum inhibiting concentration of compound in mg. percent |
|---|---|
| Staphylococcus aureus | 0.04 |
| Escherichia coli | 0.0024 |
| Salmonella typhosa | 0.02 |
| Streptococcus agalactiae | 0.04 |
| Erysipelothrix insidiosa | 0.0047 |

Thus the compounds of Formula I are adapted to be combined with various carriers known to the art to form compositions designed to counteract bacterial growth. When so composed in the form of dusts, suspensions, ointments, tablets or the like, they may serve as disinfectant compositions for eradicating bacterial growth.

The compounds of Formula I wherein R is

are particularly noteworthy in that they are highly efficacious in suppressing bacterial infection in animals. Thus when administered intraperitoneally or perorally to mice lethally infected by Staphylococcus aureus, protection is secured by dosages of these compounds in far less than host toxic amount. Effective intraperitoneal dosages of these compounds are as low as 0.18 mg./kg., while their $ED_{50}$ upon peroral administration ranges from about 10 to about 100 mg./kg.

The compounds of this invention may be prepared in a number of ways. Their synthesis is readily carried out using easily accessible raw materials and involves no unusual procedures. In the preparation of the amino compounds of Formulae I and II furonitrile and the appropriate 5-amino-4-cyano-1-alkylpyrazole are brought together in the presence of a solvent such as isopropanol and an alkaline condensing agent such as sodium methylate, advantageously under the influence of heat, until the reaction is complete; whereupon the reaction product is secured in conventional fashion, recrystallized, if desired, in customary fashion from solvents such as ethanol, isopropanol and aqueous mixtures thereof and then nitrated with a suitable nitrant such as mixed acid under appropriate conditions.

Alternatively the amino compounds of Formulae I and II may be obtained by treating the corresponding chloro derivatives with amines in the presence of a solvent such as methanol or dimethylformamide advantageously under the influence of heat until the reaction is complete whereupon the product is secured in conventional fashion by removal of solvent and/or cooling and said product, if desired, is crystallized using a suitable solvent such as methanol, dimethylformamide or aqueous mixtures thereof.

In the preparation of the hydroxy compounds of Formulae I and II furoyl chloride and the appropriate 5-amino-4-cyano-1-alkylpyrazole are brought together in a suitable solvent such as pyridine, advantageously under the influence of heat, to prepare an N-(4-cyano-1-alkyl-5-pyrazolyl)-2-furamide which is recovered in customary fashion and subjected to an oxidizing agent such as hydrogen peroxide in the presence of a base and advantageously under the influence of heat to yield the 6-(2-furyl) - 1 - alkyl-1H-pyrazolo[3,4-d]pyrimidin-4(5H)-one which upon nitration with a suitable nitrant such as mixed acid is converted to the corresponding nitro compound.

In the preparation of the chloro compounds of Formula II the corresponding hydroxy compounds will serve as ready starting materials. Thus the hydroxy compound may be subjected to the action of a halogenating agent such as phosphorus pentachloride, phosphorus oxychloride or mixtures thereof to accomplish replacement of the hydroxy group by chloro. The reaction is preferably conducted under the influence of heat and upon completion of the reaction a solvent such as petroleum ether is added and the mixture cooled, whereupon the precipitated product is recovered and recrystallized, if desired, from an appropriate solvent such as dimethylformamide or aqueous mixtures thereof.

In order that this invention may be readily available to and understood by those skilled in the art, the following illustrative examples of the preparation of the compounds thereof are supplied:

EXAMPLE I (NF–1040)

*4-amino-1-methyl-6-(5-nitro-2-furyl)-1H-pyrazolo [3,4-d] pyrimidine*

(A) *4-amino-6-(2-furyl)-1-methyl-1H-pyrazolo[3,4-d] pyrimidine* (F–372).—A mixture of 18.0 g. (0.19 mole) of 2-furonitrile, 23.0 g. (0.19 mole) of 5-amino-4-cyano-1-methylpyrazole [J. Org. Chem. 21:1240(1956)] and 2.0 g. (0.037 mole) of sodium methylate in 350 ml. of isopropyl alcohol is refluxed overnight. After removing the solvents in vacuo on a steam bath, the residue is shaken with 300 ml. of cold water and filtered. Recrystallization of the residue from ethanol gives the product as colorless needles melting at 219.5–220.5° in a yield of 35.4 g. (87.3%). Further recrystallization raises the melting point to 220–221° C.

*Analysis.*—Calcd. for $C_{10}H_9N_5O$: C, 55.81; H, 4.22; N, 32.54. Found: C, 55.63, 55.55; H, 4.21, 4.17; N, 32.75, 32.64.

(B) *4-amino - 1 - methyl-6-(5-nitro-2-furyl)-1H-pyrazolo[3,4-d] pyrimidine* (NF–1040).—A solution of 150 ml. of concentrated sulfuric acid is cooled to 0° C. and held near that temperature while 31.0 g. (0.144 mole) of (A) is added in small portions. A cooled solution of 15 ml. of concentrated nitric acid in 20 ml. of concentrated sulfuric acid is added dropwise below 10° C. during ca. 10 minutes. The mixture is then stirred in the cold for 0.5 hour, after which it is poured into 1 l. of ice water. Neutralization of the reaction mixture with sodium hydroxide solution causes the product to separate. The product is filtered and washed thoroughly with water to yield 20.6 g. (55%).

This may be recrystallized from dimethylformamide to give yellow needles decomposing at 344–346° C.

*Analysis.*—Calcd. for $C_{10}H_8N_6O_3$: C, 46.16; H, 3.10; N, 32.30. Found: C, 46.39; H, 3.14; N, 32.25.

EXAMPLE II (NF–1091)

*4-amino-1-propyl-6-(5-nitro-2-furyl)-1H-pyrazolo [3,4-d] pyrimidine*

(A) *5-amino-4-cyano-1-propylpyrazole* (U–1153).—A 2 l., 3 neck flask fitted with a stirrer, a condenser and a dropping funnel, is charged with 90 g. (0.738 mole) of ethoxymethylenemalononitrile and 750 ml. of ethanol. n-Propyl hydrazine (44.5 g., 0.60 mole) is added dropwise with stirring. After the addition is complete, the solution is refluxed for 2 hours. The solvent is removed in vacuo on a steam bath. The residue is slurried in a minimum of benzenepetroleum ether (50/50 by vol.). The orange solid melting at 155–160° is collected by filtration in a yield of 40 g. (36%).

Recrystallization from isopropyl alcohol raises the melting point to 159–160° (corr.).

*Analysis.*—Calcd. for $C_7H_{10}N_4$: C, 55.98; H, 6.71; N, 37.31. Found: C, 56.03; H, 6.58; N, 37.03.

(B) *4-amino-6-(2-furyl) - 1 - propyl - 1H - pyrazolo [3,4-d]pyrimidine* (F–381).—A solution of 51 g. (0.55 mole) of 2-furonitrile, 81 g. (0.54 mole) of (A) and 10 g. of sodium methylate in 600 ml. of isopropyl alcohol is refluxed for 48 hours. The solvent is removed in vacuo on a steam bath, and the residue is shaken in 400 ml. of cold $H_2O$. The solids are filtered, washed with water, and recrystallized from dilute aqueous isopropyl alcohol from which the product separates as pale yellow needles melting at 173–175° C. (corr.) in a yield of 93.5 g. (71.4%). Further recrystallization raises the melting point to 184–185° C. (corr.).

*Analysis.*—Calcd. for $C_{12}H_{13}N_5O$: C, 59.25; H, 5.39; N, 28.79. Found: C, 59.28; H, 5.38; N, 28.59.

(C) *4 - amino-6-(5-nitro-2-furyl)-1-propyl - 1H - pyrazolo[3,4-d]pyrimidine* (NF–1091).—To 250 ml. of concentrated sulfuric acid, chilled to —5° C. in an ice-salt bath, is added in portions with stirring 29.5 g. (0.12 mole) of (B). A cold solution of 50 ml. of concentrated nitric acid in 50 ml. of concentrated sulfuric acid is added dropwise during about 20 minutes below 10° C. Stirring is continued in the cold for 1 hour. The mixture is poured into about 1 kg. of ice and the acid neutralized by the addition, in a slow stream, of cold potassium hydroxide solution. The final volume is adjusted to 5 l. The product is filtered, and is washed thoroughly with cold water to remove any inorganic salts. A total of 59 g. (0.24 mole) of (B) is nitrated in this manner. The combined products are recrystallized from dimethylformamide to give the title product as yellow needles decomposing at 302–304° C. (corr.) in a yield of 27.1 g. (38.7%). Additional recrystallization raises the decomposition point to 306–307° C. (corr.).

*Analysis.*—Calcd. for $C_{12}H_{12}N_6O_3$: C, 49.99; H, 4.20; N, 29.16. Found: C, 50.22; H, 4.41; N, 29.14.

EXAMPLE III (NF–1108)

*4-amino-1-ethyl-6-(5-nitro-2-furyl)-1H-pyrazolo [3,4-d] pyrimidine*

(A) *5-amino-4-cyano-1-ethylpyrazole* (U–1160).—To a solution of 122 g. (1.0 mole) of ethoxymethylenemalononitrile in 1 l. of ethanol is added in portions 60 g. (1.0 mole) of ethyl hydrazine. When the exothermic reaction ceases, the solution is refluxed for 1 hour. The solvent is removed in vacuo on a steam bath. The residue is recrystallized from ethyl acetate-methanol solution (5:2 by volume) to give the product as colorless needles melting at 159–160° C. (corr.) in a yield of 49.5 g. The filtrate is chromatographed over alumina to give 65.9 g. of the product as tan crystals after evaporation of the solvent. The total yield is 115.4 g. (85%). For further purification it may be dissolved in ethyl acetate and chromatographed over alumina to raise the melting point to 163–163.5° C. (corr.).

*Analysis.*—Calcd. for $C_6H_8N_4$: C, 52.92; H, 5.92; N, 41.15. Found: C, 52.88; H, 6.00; N, 41.33.

(B) *4-amino - 1 - ethyl-6-(2-furyl)-1H-pyrazolo[3,4-d] pyrimidine* (F–386).—A solution of 66 g. (0.70 mole) of 2-furonitrile, 95.6 g. (0.70 mole) of (A) and 70 g. of sodium methylate in 1.5 l. of isopropyl alcohol is refluxed for 48 hours. The solvent is removed in vacuo on a steam bath, and the residue slurried in 1 l. of ice water. The crude product is filtered, washed thoroughly with water, and dried at 65° C. to give 153 g. (95.7%). Recrystallization of 93 g. from isopropyl alcohol gives the product as colorless platelets decomposing at 233–235° C. (corr.) in a yield of 61 g. (65.6% recovery). Additional recrystallization raises the decomposition point to 234–235° C. (corr.).

*Analysis.*—Calcd. for $C_{11}H_{11}N_5O$: C, 57.63; H, 4.84; N, 30.55. Found: C, 57.37; H, 4.99; N, 30.40.

(C) *4 - amino-1-ethyl-6-(5-nitro-2-furyl)-1H-pyrazolo [3,4-d]pyrimidine* (NF–1108).—25 g. of (B) is added in portions with stirring to 250 ml. of concentrated sulfuric acid below 10° C. The temperature is lowered to —5° C. by means of an ice salt bath and kept below 10° C. while a solution of 50 ml. of concentrated nitric acid in 50 ml. of concentrated sulfuric acid is added dropwise during 15 minutes. Stirring is continued in the cold for 1 hour. The mixture is poured over 1 kg. of ice, neutralized with sodium hydroxide solution, and diluted to a final volume of 5 l. The crude product is filtered, washed thoroughly with water to remove sodium sulfate, and air dried overnight. A total of 74 g. (0.32 mole) of (B) is nitrated in this manner. The combined products are recrystallized from dimethylformamide to give 4-amino-1-ethyl-6-(5-nitro-2-furyl)-1H-pyrazolo[3,4-d] pyrimidine as yellow needles decomposing at 318–319° C. in a yield of 24.5 g. (27.7%). Additional recrystallization raises the decomposition point to 320–321.5° C. (corr.).

*Analysis.*—Calcd. for $C_{11}H_{10}N_6O_3$: C, 48.17; H, 3.68; N, 30.65. Found: C, 48.37; H, 3.94; N, 30.77.

EXAMPLE IV (NF–1135)

*4-amino-1-(2-methoxyethyl)-6-(5-nitro-2-furyl)-1H-pyrazolo[3,4-d] pyrimidine*

(A) *5-amino - 4 - cyano-1-(2-methoxyethyl)pyrazole* (U–1188).—A 3 l., 3 neck flask, fitted with a stirrer, a dropping funnel, a condenser, and a thermometer, is charged with 1070 g. (21.4 moles) of 100% hydrazine hydrate. The solution is heated to 100° C. and the mantle is turned off. 2-methoxyethylchloride (Beil. 1, 337, I, 170, II, 335) (421 g., 4.46 moles) is added dropwise with stirring during 2.5 hours at 98–102° C. The resulting solution is heated for 10 hours at 105° C. and allowed to cool overnight. The product is isolated by a continuous ether extraction, during 5 days, of the crude reaction mixture. Evaporation of the ether leaves an oil which is distilled in vacuo through a Vigreux column. The fraction boiling at 83–90° C./56 mm. is collected giving a yield of 2-methoxyethylhydrazine of 316.9 g. (79%). Redistillation gives a boiling point of 84° C./50 mm., $n_D^{25.5}$ 1.4411.

*Analysis.*—Calcd. for $C_3H_{10}N_2O$: C, 39.98; H, 11.18; N, 31.08. Found: C, 39.85; H, 11.25; N, 30.81.

A solution of 152 g. (1.24 moles) of ethoxymethylenemalononitrile and 112 g. (1.24 moles) of 2-methoxyethylhydrazine in 1 l. of ethanol is refluxed for 24 hours. After removal of the solvents in vacuo, the residue is taken up in boiling benzene, treated with charcoal, and filtered. Dilution of the filtrate with petroleum ether followed by thorough chilling precipitates 5-amino-4-cyano-1-(2-methoxyethyl)pyrazole as colorless platelets melting at 110–112° C. in a yield of 132 g. (64%). Recrystallization raises the melting point to 114–115° C. (corr.).

*Analysis.*—Calcd. for $C_7H_{10}N_4O$: C, 50.59; H, 6.07; N, 33.72. Found: C, 50.53; H, 6.14; N, 33.97.

(B) *4 - amino-6-(2-furyl) - 1 - (2-methoxyethyl)-1H-pyrazolo[3,4-d] pyrimidine* (F–392).—A solution of 84 g. (0.60 mole) of 2-furonitrile, 100 g. (0.60 mole) of (A) and 10 g. sodium methylate in 1.5 l. of isopropyl alcohol is refluxed for 48 hours. The solvent is removed in vacuo, and the residue is shaken with 1 l. of ice water. The crude product is filtered, washed with water, and dried to give 122 g. (78.6%). Recrystallization of 40 g. from dilute aqueous ethanol gives colorless platelets melting at 192–193.5° C. (corr.) in a yield of 33.8 g.

*Analysis.*—Calcd. for $C_{12}H_{13}N_5O_2$: C, 55.59; H, 5.05; N, 27.02. Found: C, 55.68; H, 5.16; N, 27.23.

(C) *4 - amino-1-(2-methoxyethyl)-6-(5-nitro-2-furyl)-1H-pyrazolo[3,4-d]pyrimidine* (NF–1135).—To 400 ml. of concentrated sulfuric acid chilled to 0° C. in an ice-salt bath was added in small portions with stirring 82.0 g. (0.32 mole) of (B) below 10° C. This was followed by the dropwise addition during 1 hour below 10° of 160 ml. of concentrated nitric acid in 160 ml. of concentrated sulfuric acid. Stirring is continued in the cold for 1 hour after which the solution is poured into 3 l. of ice water. The excess acid is neutralized by the addition of 20% sodium hydroxide solution. The crude product is filtered, and washed thoroughly with water to remove inorganic salts. Recrystallization from dilute aqueous dimethylformamide gives 4 - amino-1-(2-methoxyethyl)-6-(5-nitro-2-furyl)-1H-pyrazolo[3,4-d]pyrimidine as long yellow needles decomposing at 286–287° C. (corr.) in a yield of 32.3 g. (33.7%).

Additional recrystallization raises the decomposition point to 289.5–290.5° C. (corr.).

*Analysis.*—Calcd. for $C_{12}H_{12}N_6O_4$: C, 47.37; H, 3.98; N, 27.62. Found: C, 47.30; H, 4.06; N, 27.72.

EXAMPLE V (NF–1170)

*1-methyl-6-(5-nitro-2-furyl)-1H-pyrazolo[3,4-d] pyrimidin-4(5H)-one*

(A) *N-(4-cyano-1-methyl - 5 - pyrazolyl)-2-furamide* (F–391).—To a solution of 91 g. (0.74 mole) of 5-amino-4-cyano-1-methylpyrazole in 300 ml. of pyridine is added with stirring 101 g. (0.74 mole) of furoyl chloride. After heating the solution on a steam bath for 1 hour, it is poured into 1 l. of ice water and allowed to stand overnight. The product is filtered, washed with cold water, and dried at 65° C. to give a yield of 139.7 g. (88%), M.P. 170–172° C. (corr.) Recrystallization from dilute aqueous methanol gives the product as large colorless needles melting at 171–172.5° C. (corr.).

*Analysis.*—Calcd. for $C_{10}H_8N_4O_2$: C, 55.55; H, 3.73; N, 25.92. Found: C, 55.36; H, 4.04; N, 25.95.

(B) *6 - (2 - furyl) - 1 - methyl - 1H - pyrazolo[3,4-d] pyrimidin-4(5H)-one* (F–397).—245 g. (1.13 moles) of (A) is added in small portions to a warm stirred solution of 230 ml. of 30% hydrogen peroxide and 62 g. of sodium hydroxide in 2700 ml. of water. A few ml. of ethyl acetate are added periodically to control frothing. The solution is then heated on a steam bath under reflux for 20 hours, chilled, and neutralized with glacial acetic acid. The solids are filtered, washed with cold water, and dried at 65° C. to give 167 g. of crude product. The pulverized, crude product is stirred for several minutes in acetonitrile (500 ml.), filtered, and the residue dried at 65° C. This separation process is repeated until an infrared spectrum of the solids showed an absence of a nitrile band at ca. 4.5μ. The yield of crude product melting at 276–278° C. is 138 g. Recrystallization of 45 g. of crude product from nitromethane gives 6-(2-furyl)-1-methyl-1H-pyrazolo[3,4-d] pyrimidin-4(5H)-one as colorless needles melting at 278–280° C. (corr.).

Additional recrystallization raises the melting point to 283.5–285° C. (corr.).

*Analysis.*—Calcd. for $C_{10}H_8N_4O_2$: C, 55.55; H, 3.73; N, 25.92. Found: C, 55.49; H, 3.84; N, 25.84.

(C) *1 - methyl - 6 - (5 - nitro - 2 - furyl) - 1H - pyrazolo[3,4-d]pyrimidin-4(5H)-one* (NF–1170).—101 g. (0.467 mole) of (B) is added in small portions with stirring to 300 ml. of concentrated sulfuric acid below 20° C. A solution of 50 ml. concentrated nitric acid in 50 ml. of concentrated sulfuric acid is added dropwise at 25–30° C. The temperature is kept at 25–30° for 1 hour following the addition. The reaction mixture is poured over 2 kg. of ice, and the excess acid neutralized by the addition of 2 N potassium hydroxide solution. The crude product is filtered, washed thoroughly with water, and dried at 65° C. to give 65 g. (53.2%). Recrystallization from dilute aqueous dimethylformamide gives 1-methyl-6 - (5 - nitro - 2 - furyl) - 1H - pyrazolo[3,4 - d]pyrimidin-4(5H)-one as yellow needles decomposing at 325° C. (corr.).

*Analysis.*—Calcd. for $C_{10}H_7N_5O_4$: C, 45.98; H, 2.70; N, 26.81. Found: C, 46.23; H, 2.74; N, 26.84.

EXAMPLE VI (NF–1171)

*1-ethyl-6-(5-nitro-2-furyl)-1H-pyrazolo[3,4-d] pyrimidin-4(5H)-one*

(A) *N - (4-cyano-1-ethyl-5-pyrazolyl)-2-furamide* (F–393).—To a solution of 196 g. (1.44 moles) of the compound of Example III (A), in 600 ml. of pyridine is added dropwise during 15 minutes with stirring 196 g. (1.44 moles) of furoyl chloride. The resulting solution is heated on a steam bath for 4 hours, poured into 2 l. of ice water, and neutralized by the addition of concentrated hydrochloric acid. After chilling the mixture thoroughly, the product is filtered, washed with water, and dried at 65° C. The yield of product as colorless needles melting at 145–147° C. is 260 g. (78.8%). Recrystallization of 44 g. from dilute aqueous methanol gives 34.5 g. melting at 148.5–149.5° C. (corr.). Additional recrystallization raises the melting point to 149.5–150.5° C. (corr.).

*Analysis.*—Calcd. for $C_{11}H_{10}N_4O_2$: C, 57.38; H, 4.38; N, 24.34. Found: C, 57.41; H, 4.51; N, 24.37.

(B) *1 - ethyl - 6 - (2 - furyl) - 1H - pyrazolo[3,4-d] pyrimidin-4(5H)-one (F–394).*—216 g. (0.94 mole) of (A) is added in small portions to a warm stirred solution of 190 ml. of 30% hydrogen peroxide and 51 g. of sodium hydroxide in 2300 ml. of water. A few ml. of ethyl acetate are added periodically to control frothing. The solution is heated on a steam bath under reflux for 20 hours, chilled, and neutralized with glacial acetic acid. The solids are filtered, washed with cold water and dried at 65° C. to give 146 g. The pulverized, crude product is stirred for several minutes in acetonitrile (500 ml.), filtered, and the residue dried at 65° C. This separation process is repeated until an infrared spectrum of the solids shows an absence of a nitrile band at ca. 4.5μ. The yield of crude 1 - ethyl - 6 - (2 - furyl) - 1H - pyrazolo[3,4 - d]pyrimidin-4(5H)-one melting at 223–225° C. is 51 g. Recrystallization of 40 g. of crude product from 3 l. ethanol yields short colorless crystals melting at 255–257° C. (corr.) in a yield of 33 g.

Additional recrystallization from nitromethane raises the melting point to 260–261.5° C. (corr.).

*Analysis.*—Calcd. for $C_{11}H_{10}N_4O_2$: C, 57.38; H, 4.38; N, 24.34. Found: C, 57.36; H, 4.40; N, 24.56.

(C) *1 - ethyl - 6 - (5 - nitro - 2 - furyl) - 1H - pyrazolo-[3,4-d]pyrimidin-4(5H)-one (NF–1171).*—97.0 g. (0.42 mole) of (B) is added in small portions with stirring to 300 ml. of concentrated sulfuric acid below 15° C. A solution of 45 ml. of concentrated nitric acid in 50 ml. of concentrated sulfuric acid is added dropwise during 0.5 hour at 23–30° C. After stirring in the cold for 1 hour, following the addition, the reaction mixture is poured over 3 kg. of ice, and the excess acid is neutralized with 20 N potassium hydroxide solution. The crude product is filtered, washed thoroughly with water to remove inorganic salts, and recrystallized from dilute aqueous dimethylformamide. The product separates as yellow needles in a yield of 63.2 g. (54.5%) which upon additional recrystallization gives a melting point of 267–267.5° C. (corr.).

*Analysis.*—Calcd. for $C_{11}H_9N_5O_4$: C, 48.00; H, 3.30; N, 25.45. Found: C, 48.07; H, 3.13; N, 25.63.

EXAMPLE VII (NF–1233)

*4-chloro-1-ethyl-6-(5-nitro-2-furyl)-1H-pyrazolo-[3,4-d]pyrimidine (NF–1233)*

A mixture of 390 g. (1.375 moles) of the compound of Example VI (C), and 300 g. (1.44 moles) of phosphorous pentachloride in 2 l. of phosphorus oxychloride is refluxed with stirring for 3 hours. The solution is cooled, diluted with 2 l. of petroleum ether, and chilled thoroughly. The crude product is filtered, washed thoroughly with petroleum ether, and dried to give 341 g. (84.5%). Recrystallization of 40 g. from dilute aqueous dimethylformamide gives 4-chloro-1-ethyl-6-(5-nitro-2-furyl)-1H-pyrazolo[3,4-d]pyrimidine as pale yellow needles melting at 182–183° C. (corr.) in a yield of 34 g.

Additional recrystallization raises the melting point to 182.5–183.5° C. (corr.).

*Analysis.*—Calcd. for $C_{11}H_8ClN_5O_3$: C, 44.99; H, 2.74; N, 23.85. Found: C, 44.94; H, 2.62; N, 23.91.

EXAMPLE VIII (NF–1201)

*1-ethyl-4-bis(2-hydroxyethyl)amino-6-(5-nitro-2-furyl)-1H-pyrazolo[3,4-d]pyrimidine (NF–1201)*

A mixture of 49.6 g. (0.17 mole) of the compound of Example VII and 38 g. (0.36 mole) of diethanolamine in 400 ml. of methanol is refluxed with stirring for 2 hours. The solvent is removed in vacuo. After shaking the residue with 500 ml. of ice water, the crude product is filtered, washed with water, and recrystallized from dilute aqueous methanol. The 1-ethyl-4-bis(2-hydroxyethyl)amino-6-(5-nitro-2-furyl)-1H-pyrazolo[3,4-d]pyrimidine product separates as yellow needles melting at 176–177° C. (corr.) in a yield of 38.0 g. (61.80%).

*Analysis.*—Calcd. for $C_{15}H_{18}N_6O_5$: C, 49.72; H, 5.01; N, 23.20. Found: C, 49.61; H, 5.12; N, 23.01.

EXAMPLE IX (NF–1237)

*4-chloro-1-methyl-6-(5-nitro-2-furyl)-1H-pyrazolo-[3,4-d]pyrimidine (NF–1237)*

A mixture of 65 g. (0.25 mole) of the compound of Example V (C), and 52 g. (0.25 mole) of phosphorus pentachloride in 300 ml. of phosphorus oxychloride is refluxed with stirring for 3 hours, cooled, and diluted with 500 ml. of petroleum ether. After chilling the mixture thoroughly, the crude product is filtered, washed thoroughly with petroleum ether, and dried to give 50 g. (72.5%).

Recrystallization from dilute aqueous dimethylformamide gives 4-chloro-1-methyl-6-(5-nitro-2-furyl)-1H-pyrazolo[3,4-d]pyrimidine as light yellow needles melting at 211–213° C. (corr.).

*Analysis.*—Calcd. for $C_{10}H_6ClN_5O_3$: C, 42.90; H, 2.16; Cl, 12.66. Found: C, 43.17; H, 2.38; Cl, 12.48.

EXAMPLE X (NF–1207)

*4-bis(2-hydroxyethyl)amino-1-methyl-6-(5-nitro-2-furyl)-1H-pyrazolo[3,4-d]pyrimidine (NF–1207)*

A mixture of 15.9 g. (0.057 mole) of the compound of Example IX and 12 g. (0.114 mole) of diethanolamine in 300 ml. of methanol is refluxed with stirring for 2 hours. The solvent is removed in vacuo. After shaking the residue with 300 ml. of ice water, the crude product is filtered, wash with water, and recrystallized from dilute aqueous methanol. The 4-bis(2-hydroxyethyl)amino-1-methyl-6-(5-nitro - 2 - furyl)-1H-pyrazolo[3,4-d]pyrimidine separates as yellow needles decomposing at 202–204° C. (corr.) in a yield of 13.7 g. (74%).

Recrystallization raises the decomposition point to 208–209° C. (corr.).

*Analysis.*—Calcd. for $C_{14}H_{16}N_6O_5$: C, 48.27, H, 4.63; N, 24.13. Found: C, 48.24; H, 4.78; N, 24.28.

EXAMPLE XI (NF–1040)

*4-amino-1-methyl-6-(5-nitro-2-furyl)-1H-pyrazolo-[3,4-d]pyrimidine (NF–1040)*

A solution of 1.0 g. (0.0036 mole) of the compound of Example IX and 0.6 g. (0.0039 mole) of hexamethylenetetramine in 15 ml. of dimethylformamide is heated on a steam bath with stirring for 1 hour, diluted with 10 ml. of water, and cooled. The crude product is filtered, washed with water, and recrystallized from dilute aqueous dimethylformamide. The 4-amino-1-methyl-6-(5-nitro-2-furyl)-1H-pyrazolo[3,4-d]pyrimidine separates as yellow needles decomposing at 345–346° C. (corr.) in a yield of 0.5 g. (42.6%).

EXAMPLE XII (NF–1108)

*4-amino-1-ethyl-6-(5-nitro-2-furyl)-1H-pyrazolo[3,4-d] pyrimidine (NF–1108)*

A solution of 1.0 g. (0.0034 mole) of the compound of Example VII and 0.5 g. (0.0034 mole) of hexamethylenetetramine in 25 ml. of dimethylformamide is heated on a steam bath with stirring for 3 hours, diluted with 15 ml. of water, treated with charcoal, and filtered. The filtrate is chilled thoroughly and the crude product is filtered and washed with water. Recrystallization from dilute aqueous dimethylformamide gives 4-amino-1-ethyl-6-(5-nitro-2-furyl)-1H-pyrazolo[3,4-d]pyrimidine as yellow needles decomposing at 318–319° C. (corr.) in a yield of 0.2 g. (21.5%).

What is claimed is:

1. A compound of the formula:

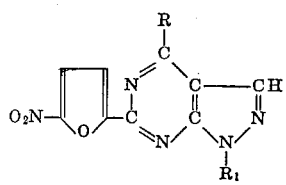

wherein R is a member of the group consisting of hydroxy, chloro and

in which X and Y is a member of the group consisting of hydrogen and hydroxyethyl; and $R_1$ is a member of the group consisting of lower alkyl and methoxyethyl.

2. A compound of the formula:

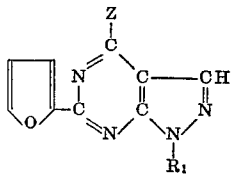

wherein Z is amino; and $R_1$ is a member of the group consisting of lower alkyl and methoxyethyl.

3. The compound 4-bis(2-hydroxyethyl)amino-1-methyl-6-(5-nitro-2-furyl)-1H-pyrazolo[3,4-d]pyrimidine of the formula:

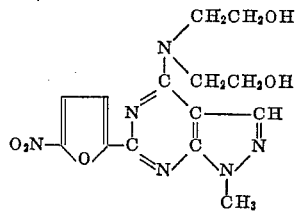

4. The compound 4-bis(2-hydroxyethyl)amino-1-ethyl-6-(5-nitro-2-furyl)-1H-pyrazolo[3,4-d]pyrimidine of the formula:

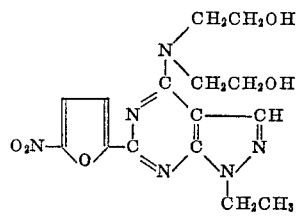

5. The compound 4-imino-1-(2-methoxyethyl)-6-(5-nitro-2-furyl)-1H-pyrazolo[3,4-d]pyrimidine of the formula:

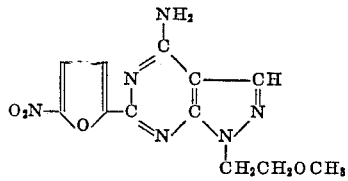

6. The compound 4-amino-1-ethyl-6-(5-nitro-2-furyl)-1H-pyrazolo[3,4-d]pyrimidine of the formula:

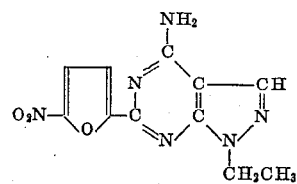

7. The compound 4-amino-6-(5-nitro-2-furyl)-1-methyl-1H-pyrazolo[3,4-d]-pyrimidine of the formula:

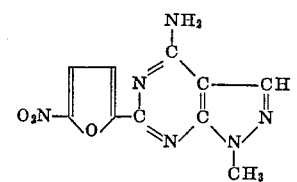

8. The compound 1-methyl-6-(5-nitro-2-furyl)-1H-pyrazolo[3,4-d]pyrimidin-4(5H)-one of the formula:

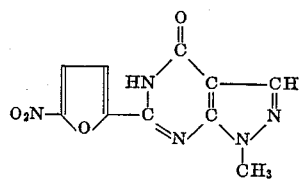

9. The compound 1-ethyl-6-(5-nitro-2-furyl)-1H-pyrazolo[3,4-d]pyrimidin-4(5H)-one of the formula:

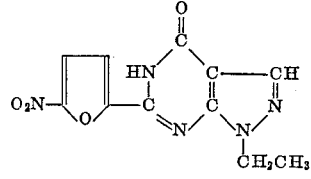

10. The compound 4-chloro-1-ethyl-6-(5-nitro-2-furyl)-1H-pyrazolo[3,4-d]-pyrimidine of the formula:

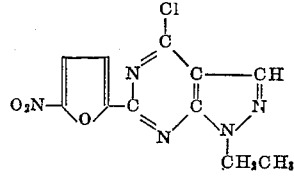

11. The compound 4-chloro-1-methyl-6-(5-nitro-2-furyl)-1H-pyrazolo[3,4-d]-pyrimidine of the formula:

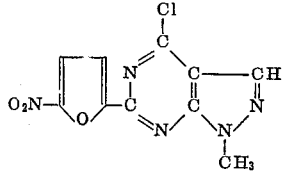

12. The compound 4-amino-1-(2-methoxyethyl)-6-(2-furyl)-1H-pyrazolo[3,4-d]-pyrimidine of the formula:

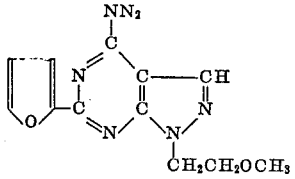

13. The compound 4-amino-1-ethyl-6-(2-furyl)-1H-pyrazolo[3,4-d]pyrimidine of the formula:
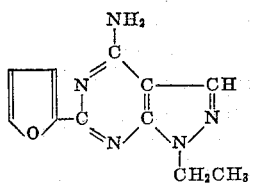
14. The compound 4-amino-1-methyl-6-(2-furyl)-1H-pyrazolo[3,4-d]pyrimidine of the formula:
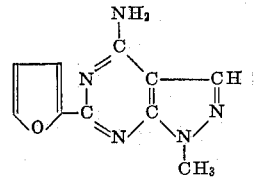
References Cited
UNITED STATES PATENTS
3,139,431  6/1964  Hayes _____ 260—347.3 X
3,211,731  10/1965  Schmidt et al. _____ 260—256.4
FOREIGN PATENTS
1,311,786  11/1962  France.
ALEX MAZEL, *Primary Examiner.*
HENRY R. JILES, *Examiner.*
MARY U. O'BRIEN, *Assistant Examiner.*